United States Patent [19]

Aladiev et al.

[11] 4,287,443

[45] Sep. 1, 1981

[54] LIQUID-METAL MAGNETOHYDRODYNAMIC CONVERTER

[76] Inventors: Ivan T. Aladiev, ulitsa Marshala Birjuzova, 43, kv. 21, Moscow; Vazha A. Dzhamardzhashvili, ulitsa Juramishvili, 17, kv. 61, Tbilisi, both of U.S.S.R.

[21] Appl. No.: 77,313

[22] Filed: Sep. 20, 1979

[51] Int. Cl.³ .............................................. H02K 45/00
[52] U.S. Cl. ...................................................... 310/11
[58] Field of Search ........................................... 310/11

[56] References Cited

U.S. PATENT DOCUMENTS

| | | | |
|---|---|---|---|
| 3,465,180 | 9/1969 | Von Ohain et al. | 310/11 |
| 3,467,842 | 9/1969 | Carrasse | 310/11 |
| 3,878,410 | 4/1975 | Petrick et al. | 310/11 |
| 4,200,815 | 4/1980 | Petrick et al. | 310/11 |

*Primary Examiner*—Donovan F. Duggan
*Attorney, Agent, or Firm*—Steinberg & Raskin

[57] ABSTRACT

A liquid-metal magnetohydrodynamic converter comprising such hydraulically interconnected components as a heat source, a two-phase nozzle, a separator, a liquid diffuser, a liquid metal cooler, a magnetohydrodynamic generator and a means for heating and delivering liquid metal supplied from the cooler, all of said components being arranged successively so as to form a loop. A steam diffuser and a condenser are interconnected and hydraulically coupled to the separator and the means for heating and delivering liquid metal supplied from the cooler, respectively.

4 Claims, 4 Drawing Figures

LIQUID-METAL MAGNETOHYDRODYNAMIC CONVERTER

FIELD OF THE INVENTION

This invention relates to electric-power production through direct conversion of thermal energy into electric energy and in particular to liquid-metal magnetohydrodynamic converters.

It can be used to advantage as a power source on space vehicles, submarines and aircraft and also in electric-power production at steam electric and nuclear power stations.

Prior Art

With the advancement of space vehicles and fast-neutron reactor technology and in view of the need to increase the efficiency of steam electric stations and nuclear power stations, there arises a problem of providing a high-temperature energy converter using a liquid-metal working substance, one of the possible solutions to the problem being the provision of a liquid-metal magnetohydrodynamic (MHD) energy converter whose advantages over energy converters of other types include a high specific power, improved static parameters and in effect high reliability at high temperatures. However, a problem encountered in the development of a liquid-metal MHD converter having an acceptable efficiency consists in ensuing highly effective conversion of thermal and potential energy of a two-phase liquid-metal working substance into mechanical energy of liquid and subsequent conversion of this energy into electric energy by the use of a MHD generator.

Known in the art is a liquid-metal magnetohydrodynamic converter (cg. USSR Inventor's Certificate No. 196,197, Cl. 21 g 35, 1965) comprising such hydraulically interconnected and successively arranged components as a heat source, a two-phase nozzle, a separator, a steam diffuser and a condenser hydraulically coupled to the heat source, as well as a magnetohydrodynamic generator and a liquid diffuser which are hydraulically interconnected and coupled to the separator and the heat source. In the aforesaid converter the magnetohydrodynamic generator is coupled directly to the separator, while the liquid diffuser is connected to the outlet of the magnetohydrodynamic generator.

The arrangement of the known converter does not, however, allow generation of electric energy in the MHD generator when the temperature of working liquid is below the lower cyclic temperature without additional energy losses even during a reversible cycle, a limitation resulting in low efficiency of the MHD generator used with the converter, which in its turn reduces the efficiency of the entire converter. Thus, the known converter has a comparatively low operational reliability.

Another disadvantage of the aforesaid converter is that the liquid phase is to be fully separated from the steam phase, which results in the utilization of large separation surfaces and consequently in great unrecoverable frictional losses of liquid metal (hereinafter referred to as liquid) in the separator whereby the separator efficiency and thus the efficiency of the entire converter will be reduced.

BRIEF DESCRIPTION OF THE INVENTION

It is an object of the present invention to provide a liquid-metal magnetohydrodynamic converter having an enhanced efficiency.

Another object of the invention is to increase operational reliability of the converter.

The above objects are accomplished by that a liquid-metal magnetohydrodynamic converter comprising such hydraulically interconnected and successively arranged components as a heat source, a two-phase nozzle, a separator, a steam diffuser and a condenser hydraulically connected to the heat source, as well as a liquid diffuser and a magnetohydrodynamic generator which are hydraulically interconnected and coupled to the separator and the heat source, according to the invention, additionally includes a liquid metal cooler hydraulically connected via its inlet to the liquid diffuser, coupled via the inlet thereof to the separator and hydraulically connected via the outlet thereof to the inlet of the magnetohydrodynamic generator, and a means for heating and delivering liquid metal supplied from the cooler, the inlets of said means being hydraulically connected to the condenser and the magnetohydrodynamic generator and the output thereof to the heat source.

Preferably the converter forming the subject of the present invention comprises at least one liquid nozzle whose inlet is hydraulically connected to the liquid metal cooler and the separator has at least one liquid inlet hydraulically connected to the liqud nozzle.

It is of advantage that the means for heating and delivering liquid supplied from the cooler includes such interconnected components as a mixing condenser having its steam inlet hydraulically connected to the condenser and the inlet thereof to the magnetohydrodynamic generator, and a pump whose outlet is hydraulically connected to the heat source.

The present invention allows generation of electric energy in the magnetohydrodynamic generator with the temperature of working liqud being below the lower cyclic temperature, an advantage increasing the efficiency and reliability of the converter.

Furthermore, in compliance with the present invention, injection of undercooled liquid into a partially separated jet of a two-phase mixture permits obtaining a pure liquid after the separator with a rather coarse preliminary separation whereby the known requirements for the separator become less stringent, an advantage increasing the separator efficiency and in effect the efficiency of the entire converter.

BRIEF DESCRIPTION OF DRAWINGS

The other objects and advantages of the present invention will become apparent from the discussion of specific embodiments thereof, taken in conjunction with the accompanying drawings, wherein.

DETAILED DESCRIPTION OF THE INVENTION

Figure 1:
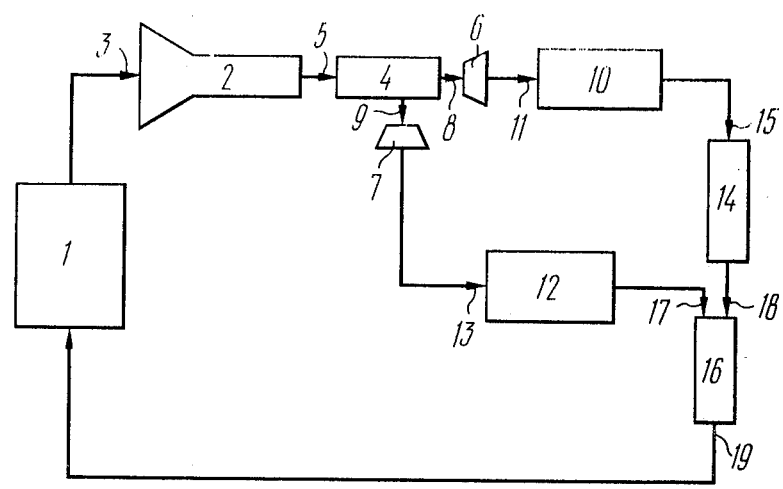
FIG. 1 is a block diagram of a liquid-metal magneto-hydrodynamic converter according to the invention.

The liquid-metal magnetohydrodynamic converter forming the subject of the present invention comprises a heat source 1 (FIG. 1) with a two-phase nozzle 2 hydraulically connected thereto via its inlet 3. A separator 4 is hydraulically connected to the nozzle 2 via its inlet 5. A liquid diffuser 6 and a steam diffuser 7 are hydraulically connected to the separator 4 via respective inlets 8 and 9 thereof. A liquid metal cooler cooler 10 via its inlet 11 and a condenser 12 via its inlet 13 are hydraulically connected to the liquid diffuser 6 and the steam diffuser 7, respectively. An inlet 15 of the magnetohydrodynamic generator 14 is hydraulically connected to the cooler 10. Inlets 17, 18 and outlet 19 of a means 16 for heating and delivering liquid metal supplied from the cooler 10 are hydraulically connected to the condenser 12 and the generator 14, respectively, the outlet 19 of said means being connected to the heat source 1.

To accomplish a combination (separation-injection) cycle, the converter includes a liqud nozzle 20 (FIG. 2) hydraulically connected to the cooler 10 via its inlet 21 and to the separator 4 via its inlet 22.

Figure 2:
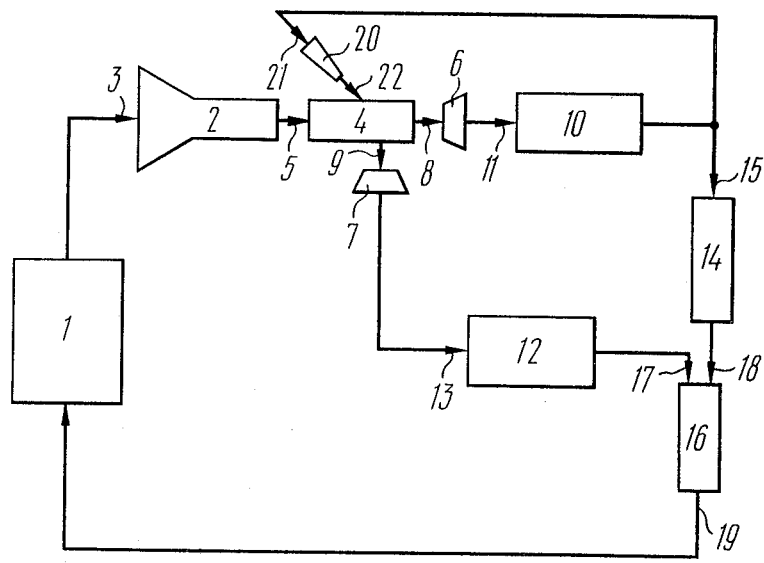
FIG. 2 is a block diagram of a liquid-metal magnetohydrodynamic converter having a liquid nozzle according to the invention.
Figure 3:
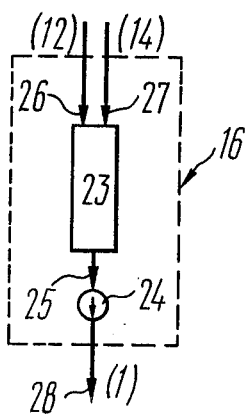
FIG. 3 is a block diagram of a means for heating and delivering liquid supplied from a cooler according to the invention.

In one of the preferred embodiments of the invention the means 16 for heating and delivering liquid metal supplied from the cooler 10 includes a mixing condenser 23 (FIG. 3) with a pump 24 hydraulically connected thereto via its inlet 25. A steam inlet 26 and a liquid inlet 27 of the condenser 23 serve respectively as the inlets 17 and 18 of the means 16 (FIGS. 1, 2), whereas an outlet 28 (FIG. 3) of the pump 24 acts as the outlet 19 of the means 16 (FIGS. 1, 2).

The liquid-metal magnetohydrodynamic converter forming the subject of the present invention operates in the following manner.

At constant pressure $P_1$ (FIG. 4) in the heat source 1 (FIG. 1) a heat flow $Q_1$ (process i-a-b of FIG. 4) is supplied in an isobaric manner to a working substance (say, liquid potassium). The resultant steam-liquid mixture having a flow rate G is expanded in an adiabatic manner in the nozzle 2 (FIG. 1) from a pressure of $P_1$ (FIG. 4), temperature $T_1$ and steam content $x_1$ at point b (FIG. 4) to constant pressure $P_2$ (FIG. 4), lower cyclic temperature $T_2$ and steam content $x_2$ at point c (FIG. 4), which is represented by process b-c of FIG. 4, and delivered to the separator 4 (FIG. 1). The separator 4 separates the liquid phase from the steam phase (processes c-d and c-e of FIG. 4). From the separator 4 (FIG. 1) the liquid at the rate of $1-x_2$) G is delivered to the diffuser 6 wherein the static pressure is built up in an adiabatic manner from $P_2$ (FIG. 4) to constant pressure $P_3$ (FIG. 4), which is represented by process d-f of FIG. 4, whereupon it is supplied at small speed to the cooler 10 (FIG. 1) in which the amount of heat $Q_2'$ is removed from the liquid (process f-g of FIG. 4). As this happens, the liquid temperature decreases from $T_2$ to $T_3$. Thereafter the cooled liquid is supplied to the magnetohydrodynamic generator 14 (FIG. 1) wherein mechanical energy is converted into electrical energy whereby the pressure is reduced from $P_3$ (FIG. 4) to $P_2$ (FIG. 4), which is represented by process g-n of FIG. 4. In compliance with the invention the generator 14 (FIG. 1) operates at temperature $T_2$ which is appreciably below the lower cyclic temperature $T_2$, an advantage increasing the efficiency of the generator 14 and in effect the efficiency of the entire converter.

Figure 4:
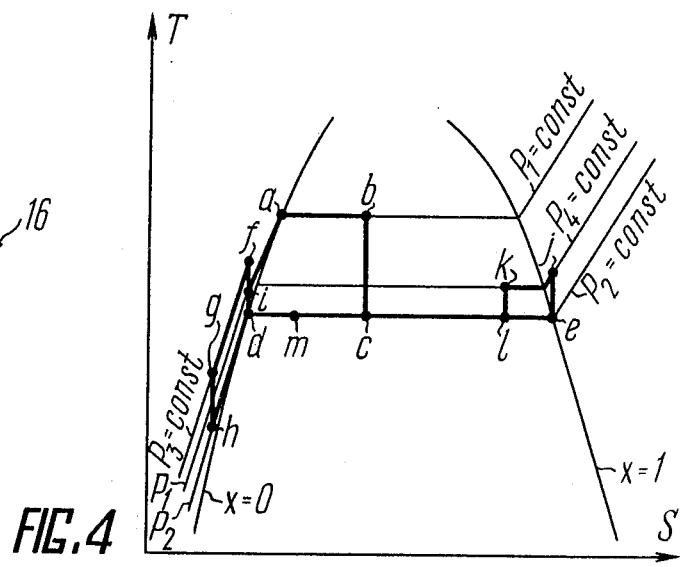
FIG. 4 is a graph illustrating a reversible thermodynamic cycle of the converter of FIGS. 1 and 2, wherein the abscissa is entropy S and the ordinate is temperature T according to the invention.

From the generator 14 the liquid is supplied to the heating and delivery means 16 to be mixed therein with a steam flow with the result that its temperature increases from $T_3$ to the lower cyclic temperature $T_2$ (process n-d of FIG. 4) due moist steam flow condensation (process l-d of FIG. 4). This steam flow is delivered to the means 16 (FIG. 1) from the separator 4 through the diffuser 7 wherein the static pressure increases from $P_2$ (FIG. 4) to constant pressure $P_4$ (FIG. 4), which is represented by process e-j of FIG. 4, and to the condenser 12 (FIG. 1) wherein the steam is partially condensed, i.e., the amount of rejected heat is $Q_2'$ (process j-k of FIG. 4). In this case, potential energy $(i_k-i_l)$ of moist steam after condenser 12 (FIG. 1) where $i_k$ is moist steam enthalpy at point k (FIG. 4) and $i_l$ is moist steam enthalpy at point 1 (FIG. 4) is utilized for partial or complete delivery of the liquid to the means 16. After the means 16 completes heating and delivery (process n-d of FIG. 4 and process d-i shown in the same drawing), the sum liquid flow returns to the source 1 from the means 16 (FIG. 1), thereby completing the cycle.

In the case of a combination (separation-injection) cycle an undercooled liquid flow is divided into two forms after the cooler 10 (FIG. 2): one portion thereof being supplied to the generator 14 and the other portion thereof to the liquid nozzle 20 wherein it is accelerated and supplied to the inlet 22 of the separator 4. In the separator 4 a jet of undercooled liquid is mixed with a two-phase mixture flow separated in a worse manner from the steam phase (separation process c-m of FIG. 4). As a result, the steam of the separated two-phase flow is condensed with the jet of undercooled liquid (process m-d of FIG. 4).

In one of the preferred embodiments of the invention the heating and delivery means 16 (FIG. 3) operates in the following manner.

The inlets of the mixing condenser 23 receive moist steam and undercooled liquid. Consequently, the steam is condensed and the sum flow is supplied to the pump 24 wherein the pressure of the mixture is bluit up to $P_1$ (FIG. 4) and then to the heat source.

What is claimed is:

1. A liquid-metal magnetohydrodynamic converter comprising:

a heat source having an inlet and an outlet;

a two-phase nozzle having an inlet and an outlet and hydraulically connected via said inlet thereof to said outlet of said heat source;

a separator having a steam inlet, a first outlet and a second outlet and hydraulically connected via said steam inlet thereof to said outlet of said two-phase nozzle;

a liquid diffuser having an inlet and an outlet and hydraulically connected via said inlet thereof to said first outlet of said separator;

a steam diffuser having an inlet and an outlet and hydraulically connected via said input thereof to said second outlet of said separator;

a liquid metal cooler having an inlet and an outlet and hydraulically connected via said inlet thereof to said outlet of said liquid diffuser;

a condenser having an inlet and an outlet and hydraulically connected via said inlet thereof to said outlet of said steam diffuser;

a magnetohydrodynamic generator having an inlet and an outlet and hydraulically connected via said inlet thereof to said outlet of said liquid metal cooler;

a means for heating and delivering liquid metal supplied from said cooler, having a first inlet, a second inlet and an outlet and hydraulically connected via said first inlet thereof to said oulet of said magnetohydrodynamic generator, via said second inlet thereof to said outlet of said condenser and via said outlet thereof to said inlet of said heat source.

2. A converter as claimed in claim 1, which includes at least one liquid nozzle having an inlet and an outlet and hydraulically connected via said inlet thereof to said outlet of said liquid metal cooler, said separator having at least one inlet hydraulically connected to said outlet of said liquid nozzle.

3. A converter as claimed in claim 1, wherein said means for heating and delivering liquid supplied from the cooler comprises:

a mixing condenser having a steam inlet, an inlet acting respectively as said first and second inlets of said means for heating and delivering liquid metal supplied from said cooler, and an outlet;

a pump having an inlet and an outlet acting as said outlet of said means for heating and delivering liquid metal supplied from said cooler and hydraulically connected via said inlet thereof to said outlet of said mixing condenser.

4. A converter as claimed in claim 2, wherein said means for heating and delivering liquid metal supplied from said cooler includes:

a mixing condenser having a steam inlet, an inlet serving respectively as said first and second inlets of said means for heating and delivering liquid metal supplied from said cooler, and an outlet;

a pump having an inlet and an outlet serving as said outlet of said means for heating and delivering liquid metal supplied from said cooler and hydraulically connected via said inlet thereof to said outlet of said mixing condenser.

* * * * *